United States Patent Office 3,221,297
Patented Nov. 30, 1965

3,221,297
SYSTEM FOR OBTAINING A COMPOSITE SEISMIC SIGNAL BY GENERATING A NUMBER OF DISCRETE SINGLE FREQUENCY SEISMIC WAVEFORMS AND RECORDING INDIVIDUALLY THE DETECTED REFLECTIONS
George W. Smith and Darius D. Slavinskas, Calgary, Alberta, Canada, assignors, by mesne assignments, to Esso Production Research Company, a corporation of Delaware
Filed Dec. 2, 1960, Ser. No. 73,269
5 Claims. (Cl. 340—15.5)

This invention relates to an improved method of seismic prospecting. The invention especially pertains to a seismic recording system. It particularly relates to a system for generating and recording seismic information, including generating a number of discrete single frequency waveforms which are transmitted through the earth and recorded individually.

Geophysical prospecting using artificially induced seismic disturbances has found wide application in the search for petroleum and other products. It is the general practice to initiate an explosion or other seismic disturbance at a point near the surface of the earth to direct seismic waves downward into the earth from that point. The waves continue to travel downward within the earth, until they encounter discontinuities in the earth's structure in the form of various substrata formations and the like. These discontinuities have the effect of reflecting at least a portion of the seismic waves back toward the surface of the earth. By arranging a plurality of geophones or other seismic transducers at spaced distances from the seismic disturbance point it is possible to detect the arrival of the reflected seismic waves at the surface of the earth. These detected waves are translated into electrical impulses which are then indicative of the character of the ground motion and are usually referred to collectively as a seismic signal which is in effect a composite signal made up of a plurality of electrical signals varying in frequency and amplitude.

A record is made of the seismic signals and may be phonographically reproducible such as recorded on magnetic tape and then subsequently analyzed by various manners of visual presentation such as wiggly trace, variable density presentation, etc. In one seismograph record (also called a seismogram) a plurality of traces are arranged in parallel relation, each representative of the output from an individual geophone or geophone station. The record is provided with a suitable timing mark so that when the seismogram is later examined the time required for seismic energy to travel downward through the earth and be reflected back to the geophone may be determined. This general method of seismic prospecting permits the determination of valuable geological information particularly useful, for example, in the exploration for petroleum.

The artificially induced seismic disturbance has most frequently been produced by initiating an explosion such as dynamite in a shot hole drilled in the surface of the earth. This has certain drawbacks, including the hazard of handling the explosive and also the cost of such explosive and of the drilling of shot holes. Recently, interest has been shown in the industry in mechanical type seismic transducers. One such mechanical device consists simply in raising a large mass a distance above the surface of the earth and dropping it; the force with which the weight or mass strikes the earth induces a seismic disturbance. This system, although having some merit, has the disadvantage of being difficult to transport because of its great weight. The methods of detonating an explosive and dropping a weight are both effective but the operator has almost no control over the frequency, phase or amplitude of the components which go to make up the seismic disturbance sometimes called a downtraveling pulse. It is very desirable to control the shape of the downtraveling pulse. In general, it can be said that pulse usually is preferred to be quite sharp, i.e. of short duration and high magnitude. In many cases of seismic prospecting using dynamite explosion the higher frequencies, or frequencies toward the upper end of the spectrum are rather important and contain much information about the subsurface formations. However, in the explosive means of creating a seismic disturbance, for example, the seismic disturbance or seismic waveform may contain the high frequency components but due to their attenuation as they pass through the earth with respect to the attenuation of the lower frequency components, reflections of the high frequency components are most difficult to obtain in their desired effectiveness. This, in turn, then results in the loss of valuable information.

In the most commonly used systems of seismic exploration in which an explosion is detonated near the surface of the earth (or a weight is dropped) the downtraveling pulse is a composite signal. The energy which is reflected to the surface of the earth is detected by geophone or other seismic transducers and is detected as a composite signal having many frequency components. The entire composite signal detected at the surface of the earth is then recorded. The equipment required for the recording of the detected signal is quite elaborate with the normal trend being toward recording the signal upon a magnetic recording medium. In addition to the elaborate equipment, quite a number of attendants are required for the carrying out of the drilling of the shot holes, loading the explosive in the hole and in recording of the composite seismic signal. As will be seen, the present invention greatly simplifies this system and provides means for controlling, in effect, the shape of the downtraveling pulse.

The pulse generated by a dynamite explosion, for example, can be considered as being made up of many frequencies of various amplitudes and phases and the shape of this pulse is practically impossible to control. The phases of the different frequencies are such that these different components add over a short interval of time and cancel out at other times. The analysis of pulses into their frequency components is a well known mathematical technique known as the Fourier integral. In periodic functions, in which the frequencies present are integral multiples of the fundamental frequency, the analysis is simpler and one mathematical method of analysis is referred to as the Fourier series. The various frequency components, and their amplitude and phase relationships, then determine or define the shape of the downtraveling pulse. If these frequency components were controlled, then the shape of the downtraveling pulse could likewise be controlled. This invention accomplishes what may be considered in effect a controlled downtraveling pulse and is obtained broadly by means of generating energy as one discrete single frequency for each of the various frequency components which it is desired that the downtraveling pulse contain. In other words, the desired shape of the downtraveling pulse is determined; from this the frequency components are determined and then each component is generated and imparted into the earth as a discrete signal. Studies have shown that a series of frequency components (or sine waves) 1 c.p.s. apart over a reasonable frequency range of 20 c.p.s. to 80 c.p.s., for example, is normally adequate to define a usable seismic signal.

Although the discrete frequencies may be generated and imparted into the earth simultaneously it is preferred that a single frequency be generated at a time. It is much easier to generate a single frequency pulse than to use dynamite as no shot hole or handling of explosives are necessary; further the separation of the detected signal from noise is much simpler as the reflected energy is concentrated at one frequency and the noise is spread out over a rather wide band. A single frequency sine wave force can be generated by means of counter rotating eccentric weights, for example.

With this manner of exploration, a continuous seismic signal is not recorded as is done in conventional practice. Information for and from each single frequency waveform is recorded during the transmitting of that frequency. The only recording required in the field during exploration operation in a preferred form of seismic exploration under this invention is the phase and amplitudes of the detected signal relative to the source frequency for each single frequency generated. This simplifies the recording requirements. For example, recording equipment can be simple since recording of the amplitude and phase relative to the source are all that is required for each frequency. This defines each frequency component, and the frequency components in turn define the effective reflected seismic signal. These principles are readily accomplished in the practice of the present invention which broadly includes the system of obtaining a seismic signal having a preselected frequency range which in a preferred embodiment comprises:

(a) Generating or initiating a single constant frequency elastic waveform near the surface of the earth of sufficient magnitude to penetrate the earth and be reflected by sursurface strata;

(b) Detecting the signal reflected at a point remote from the point of transmission of the elastic seismic waveform;

(c) Detecting and recording the amplitude ratio and phase of the detected reflected signal with respect to the generated transmitted seismic waveform;

(d) Repeating steps (a), (b) and (c) above for each of the different frequency components in the desired frequency range.

It is thus clear that by the practice of this invention that a composite seismic signal having a desired preselected frequency range is defined. That is, the phase relationship and the amplitude ratio of each harmonic component necessary to make a composite seismic signal is recorded. The recording of each component is very brief; in a preferred form being merely two numbers for each frequency, namely numbers representing (1) the phase shift of the frequency component, and (2) the amplitude ratio. The information thus recorded may then be used to synthesize a composite seismic signal. The synthesized composite signal which is obtained can be processed and displayed in a manner similar to that done with present seismic signals. Further, the practice of filtering the seismic signal can be easily accomplished by readily adjusting the amplitude and phase of the components recorded during the final synthesis.

The invention may be better understood and additional objects will be either expressed or apparent from the following description taken in connection with the drawing in which.

Figure 1:
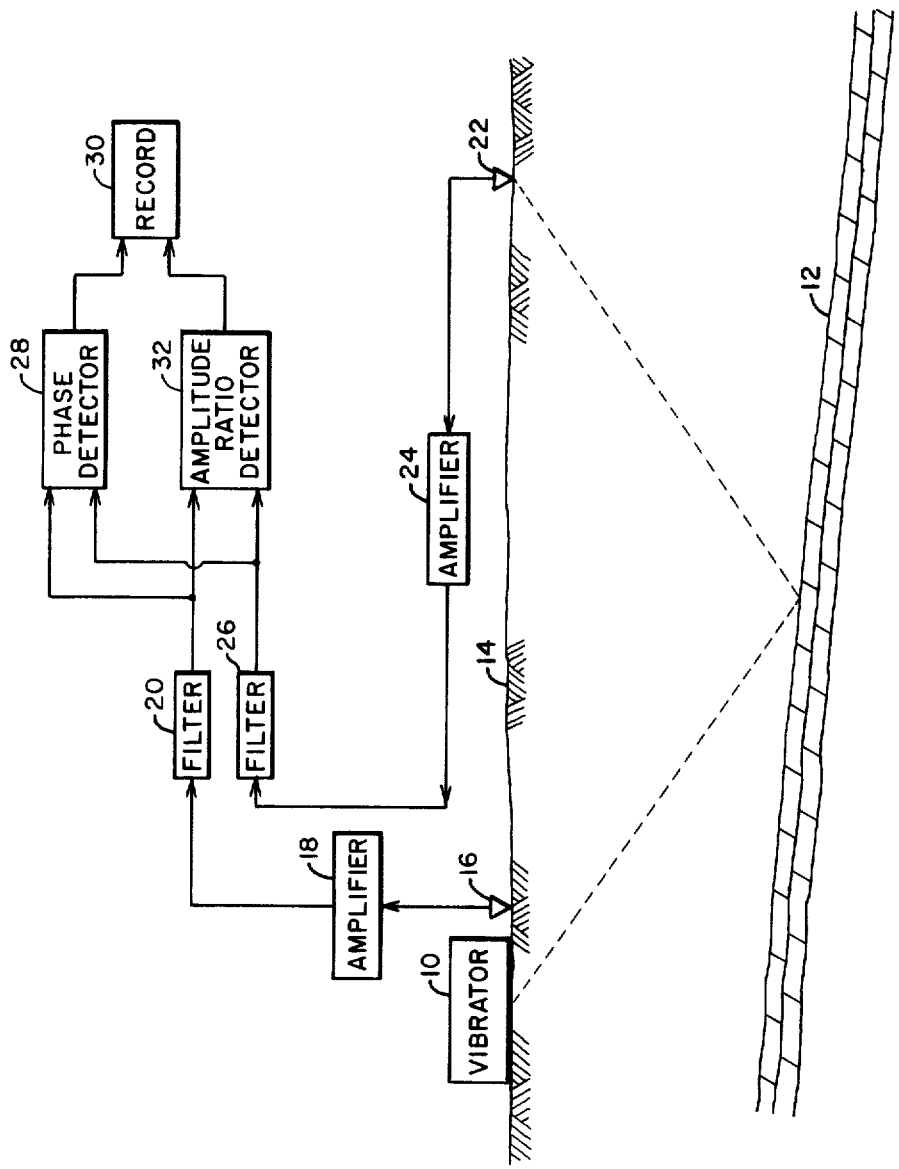
FIG. 1 illustrates, in block diagram form, a system of the invention.

In FIG. 1 of the drawing numeral 10 represents a vibrator which is placed near the surface of the earth and which is of a character to generate a constant single frequency vibration to be imparted to the earth. The vibrations should be of sufficient magnitude to be reflected by subsurface strata 12, for example, and reflected to the surface of the earth 14. Vibrator 10 is preferably of a character to be adjustable to different frequencies; that is, being adjustable over a sufficient range to include each frequency of the desired frequency spectrum. It is preferred that the sine wave generated be of sufficient duration so that it may be said to be in a steady state condition. A geophone 16 is coupled to the surface of the earth 14 closely adjacent vibrator 10. The output of geophone 16 is amplified as necessary in amplifier 18 and is then fed to filter 20. Filter 20 is a narrow bandpass filter and of a character to pass only that frequency which vibrator 10 is generating. If vibrator 10 is generating a frequency of 20 cycles per second, then filter 20 which may be a narrow bandpass filter is set to pass 20 cycles. When vibrator 10 is set to generate a frequency, for example, of 21 cycles per second, filter 20 is likewise modified to have its peak frequency of 21 cycle per second. The output of filter 20 then is seen to be essentially free of ground roll and other noise and is essentially the ground input signal.

Spaced from vibrator 10 is remote geophone station 22, preferably having a plurality of geophones. These geophones may be arranged in any well known manner to improve the signal detected, for example, arranged to emphasize the vertical motion or waves while de-emphasizing horizontal motion or waves at the geophone location. The output of geophone station 22 is fed to amplifier 24. Amplifier 24 is preferably the same amplification as amplifier 18. If amplifier 24 and amplifier 18 do not have the same amplification factor, then this must be taken into account in determining the ratio of the amplitudes of the signal detected from geophones 22 and that of geophone 16. The output of amplifiers 24 is fed to filter 26 which is similar to filter 20. The output of filter 26 may be called for convenience the "ground output signal." The output of filter 20 and the output of filter 26 are fed to phase detector 28 where the phase of the two signals are compared. Phase detector 28 determines the difference in phase between the "earth input signal" from filter 20 and the "ground output signal" from filter 26. The phase detected by phase detector 28 is then recorded on recorder 30.

The output from filter 20 and the output from filter 26 are also fed to amplitude ratio detector 32. Amplitude ratio detector 32 is of a character to detect the ratio of the ground output signal with respect to the earth input signal. Various means of determining the amplitude ratio between two signals are well known in the art. The output of amplitude ratio detector 32 is then recorded on multiple channel recorder 30.

In operation the system shown in FIG. 1, one determines by known means and from the area which is to be explored, what frequency range is desired to be in the seismic signal. The frequency range of interest is normally from about 20 c.p.s. to about 80 c.p.s. Vibrator 10 then is set to vibrate at one of these frequencies for a sufficient length of time to obtain what may be considered essentially a steady state condition. The time required for vibrator 10 to reach essentially steady state can easily be determined by one skilled in the art. This time is usually short, normally being a matter of a few seconds or so. The values which are of interest on record 30 are the phase and the amplitude ratio between the two detected signals after steady state has been reached by vibrator 10 and after geophone location 22 is detecting reflections from the steady state energy of vibrator 10. These values may be readily detected and recorded on record 30. The above operation is repeated for each discrete frequency component of the desired frequency spectrum. Each frequency component of the selected frequency spectrum for the seismic signal is thus clearly and briefly defined.

As the local geophone filter 20 output is regarded as the input to the ground it is not important how the energy was put into the earth; that is, so long as a dense energy spectrum is not generated. Thus, amplitude or phase variations introduced by difference in coupling the vibrator to the ground or by other variable effects are of no importance. Also, harmonics set up by allowing the generator or vibrator to thump or bounce on the earth's surface are not important as long as the response of the peaked filters is down far enough at these harmonic frequencies, which are one octave or more removed from the fundamental. That is to say, it is not necessary to insure that vibrator 10 is rigidly fastened to the earth except from the view of maximum mechanical efficiency.

The recording equipment for the system of this invention can also be simple since numbers describing frequency, and amplitude and phase ratios are all that is required for each frequency component of the desired spectrum. Phase detector 28 can be any commercially available phase detector and amplitude ratio detector 32 may be any convenient amplitude comparison device. The results of reading of the phase detector and the amplitude comparison device can be recorded simply by being written down by an observer or as will be shown in FIG. 2, the results may be automatically recorded.

This manner of recording seismic data is a very informative method of data presentation. The data then comes as a number of sine waves of various frequencies, amplitudes and phase shifts. This provides directly a Fourier analysis of the complete record as well as the amplitude and phase curves of the filter effects of the earth. The sine waves of the various frequencies can then be added to produce a conventional seismic signal or conventional record if required. It is also seen that any required length in record may be obtained by generating a sufficient number of discrete frequencies for vibrator 10. Furthermore, bandwidth is unrestricted except by earth consideration and the maximum resolution may always be obtained by generating a range of sufficiently high frequencies.

Figure 2:
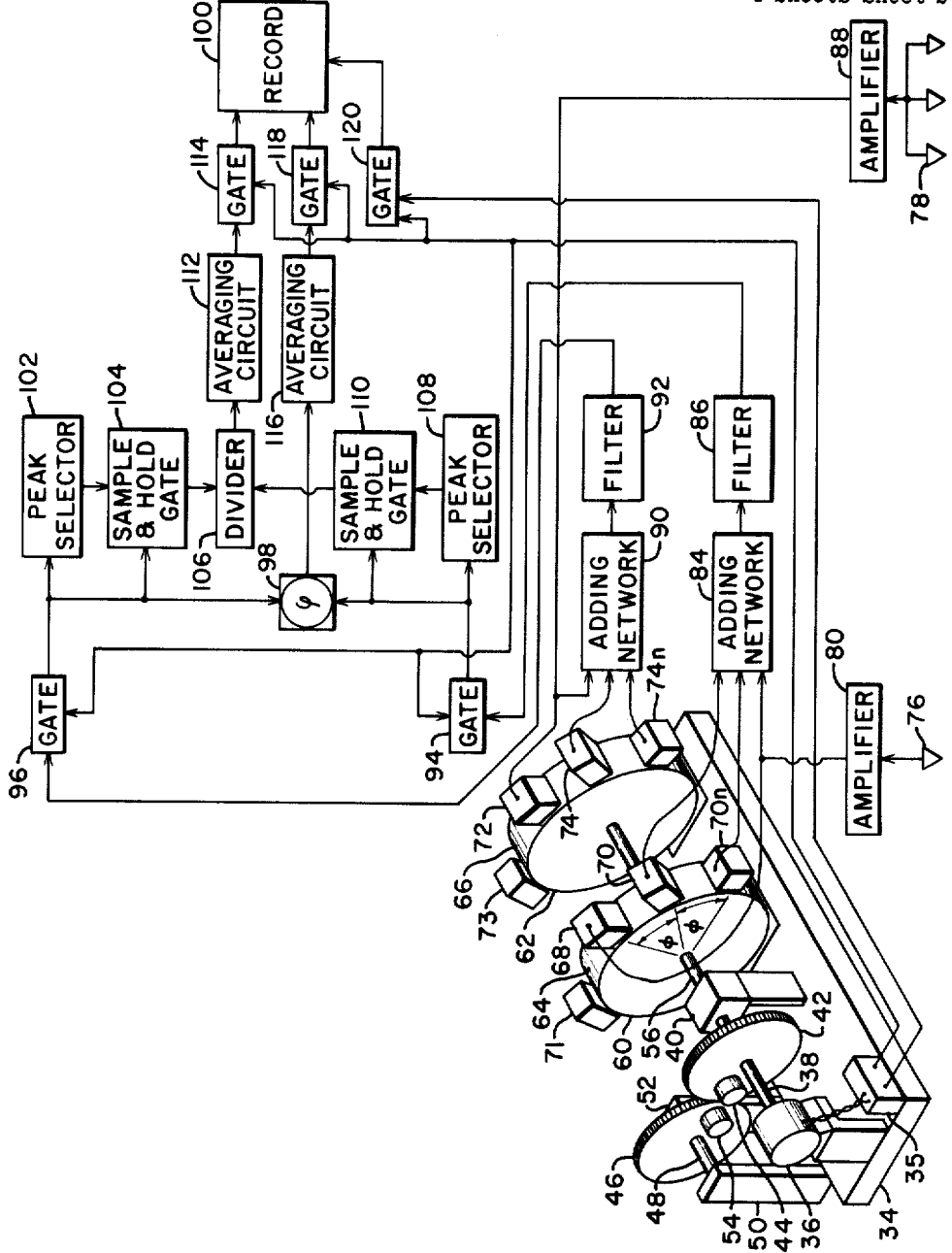
FIG. 2 illustrates the best mode contemplated for carrying out the invention.

Referring now to FIG. 2 of the drawing, there is illustrated the best mode contemplated for carrying out the invention. Illustrated thereon is platform 34 on which is mounted motor 36. Motor 36 has a variable revolution per minute output controlled by control means 35 and is capable of maintaining a selected rate of rotation for a length of time as desired. Shaft 38 from motor 36 is supported at its opposite end by gear box 40. Mounted on shaft 38 is an eccentrically weighted gear 42 having eccentric weight 44. Also mounted on platform 34 is gear 46 supported from shaft 48 which in turn is supported from mounts 50 and 52. Gear 46 is eccentrically weighted, having eccentric weight 54. Gears 46 and 42 are meshed and are therefore rotatable at the same rate and in the same plane. Eccentric weights 44 and 54 are of the same weight and are mounted such that their horizontal components always cancel but their vertical components add. Since only one set of counter rotating weights are necessary they can be made of large size without encountering a problem of holding down the vibrator. Thus, the energy per frequency could be large. Forces of several hundred pounds or more are easily generated and will be adequate for most situations.

Extending from gear box 40 is shaft 56 which is supported on its opposite end by a support not shown and supported from frame 34. Mounted on shaft 56 are two magnetic recording drums 60 and 62 upon which are mounted magnetic recording mediums 64 and 66 respectively. Operably mounted on drum 60 is magnetic recording head 68 and magnetic pickup head 70. The angular distance $\phi$ between magnetic recording head 68 and magnetic pickup head 70 is determined by the ratio of gear box 40. If the ratio of gear box 40 is $n:1$; that is, its input is $n$ revolutions for each output revolution the distance between recording head 68 and reproducing head 70 is $360°/n$. This arrangement is set forth to obtain peaked time domain filters which are peaked at the frequency of rotation of the eccentric weights or the frequency of the earth input signal. Other arrangements to give various peaked time domain filter characteristics are possible. With the arrangement shown in FIG. 2, the peak frequency of the filters always correspond exactly to the generated frequency. These time domain filters will have a bandpass width depending on the arrangement of the heads.

Magnetic drum 62 likewise has magnetic recording head 72 and magnetic reproducing head 74. Magnetic recording head 72 and magnetic reproducing head 74 are spaced identically to the spacing of heads 68 and 70 on drum 60. Drums 60 and 62 are two identical peaked but separate time domain filters which are peaked at the generated frequency.

For any given frequency, any small amount of peak filtering will improve the signal-to-noise ratio since the noise is more or less uniformly distributed over the spectrum. This is especially true in this invention wherein the detected signal is the discrete frequency; that is to say all the signal energy is concentrated at one spot in the spectrum. The sharper the filter, of course, the more noise is rejected and the better the signal-to-noise ratio. Hence, by the use of reasonably sharp filters, small signal energies may be tolerated. Using for instance the time domain illustrated in FIG. 2, the signal-to-noise ratio should be increased by the factor $\sqrt{k}$ wherein $k$ is the number of heads used in the time domain unit filter. Additional reproducing heads are illustrated and identified as numeral $70n$ and numeral $74n$ on drum 60 and 62 respectively. For example, a nine head filter will give a signal-to-noise improvement of a factor of three over a flat filter. The additional reproducing heads will be spaced from each other the same angular distance as shown above with the distance between recording head 68 and reproducing head 70, for example. If necessary, erasure head 71 and erasure head 73 may be supplied for drum 60 and 62 respectively.

Located close to platform 34 is geophone 76 which is adapted to be coupled to the earth in a known manner. Spaced some distance from platform 34 is remote geophone station 78. The geophones of station 78 are placed in an array to reinforce or emphasize the more vertical reflected signals while cancelling horizontally traveling waves. The output of geophone 76 is fed to amplifier 80 to recording head 68. The output of amplifier 80 is also fed to the output of reproducing head 70 through adder means 84. The output of adding means 84 then is seen to be limited to a frequency of $f_0$, the frequency of the earth input signal, and whole number multiples thereof as other frequencies tend to cancel out. The output of adding means 84 is fed through filter 86 which may be a low bandpass filter and is of a character to eliminate the whole number multiples of $f_0$; that is, it permits only the frequency $f_0$ to pass therethrough.

Geophones of geophone station 78 are electrically connected to amplifier 88 which is fed to recording head 72 of drum 62. The output of amplifier 88 is also fed to adding means 90, to which is also fed the output of reproducing head 74. The output from adding means 90 then is similar to the output from adding means 84 in that only frequencies of $f_0$ plus whole number multiples thereof are passed therethrough. The output of adding means 90 is electrically connected to filter 92 and is similar to filter 86; that is, filter 92 filters out all of the frequency components except $f_0$.

It is desired to obtain the phase relationship and amplitude ratio between $f_0$, the earth input signal, and $f_2$, the ground output signal. These amplitude ratios and phase relationship should be obtained during a time in which the earth input signal and the ground output signal are essentially in the steady state. This may conveniently be done by use of a clock gate 94 connected to the output of filter 86 and clock gate 96 electrically connected to the output of filter 92. Gates 94 and 96 can be adapted to open a definite period of time, for example, 10 seconds or so after the vibrator means have started. A signal from vibrator motor control 35 can be used to trigger the beginning of the period of time. The delay in opening the gate would depend upon how long it takes the earth input signal $f_0$ to reach steady state and the steady state to be detected at geophone location 78. This can readily be determined adequately by one skilled in the art. The output from gates 94 and 96 are fed to a phase meter 98. The output of phase meter 98 is then recorded on recording means 100. An averaging circuit 116 and clock gate 118 can be provided between phase meter 98 and recording means 100. Record 100 may record the phase output by punch card, by analog graph, by number or other conventional means.

The output through gate 96, which is opened after steady state is reached, is fed to peak selector 102 and sample and hold circuit 104. The sample and hold circuit 104 samples the peak value or maximum amplitude upon command of the peak selector. This command is given at each peak, or maximum value, of the signal being fed to sample and hold circuit 104. The output of sample and hold circuit 104 is fed to divider 106. The output through gate 94 is fed to peak selector 108 and sample and hold circuit 110. The peak selector 108 is similar to peak selector 102 and is of a character to command sample and hold circuit to sample the peak value or the amplitude. The output of sample and hold circuit 110 is fed to divider 106. Divider 106 is of a character to divide the output of sample and hold circuit 104 by the output of sample and hold circuit 110. The output of a divider 106 is fed to an averaging circuit 112 to aid in eliminating background noise. Clock gate 114 is preferably placed between averaging circuit 112 and record means 100. Clock gates 114 and 118 are electrically connected to and is signalled by control 35 similarly as gates 94 and 96. Clock gates 114 and 118 do not open until a time has elapsed after gates 94 and 96 are opened to permit averaging of the amplitude ratio and phase reading over a desired length of time. The averaged values then are what record 100 records.

The speed of motor 36 is set at or controlled by governor or control means 35. Control means 35 may if desired represent a controlled program for generating and recording each individual frequency over a selected frequency range. Filters 86 and 92 would be programmed to follow the individual frequency of the vibrator in such case. The rotation speed setting of control means 35 is coupled either mechanically or electrically to gate 120. Gate 120, which is set to open at the same time as gates 114 and 118, is of a character to permit the value of or information containing the controlled frequency from control means 35 to pass to record 100 and be recorded thereon. The outputs of gate 114 and 118 which are the phase difference and the ratio amplitude respectively of the earth input and the ground output is recorded on recorder 100 together with the frequency.

To momentarily summarize the operation of the clock gates; it is seen that gates 94 and 96 open at the same time, that time being after a reflected essentially steady state signal is received by geophone station 78. Vibrator motor 36 receives its command to rotate at a certain frequency from control 35. By simple observations or other well known means the time which it takes motor 36 to attain the commanded rotational speed can be easily determined. Likewise, the time which the steady state input requires to be reflected from the deepest bed of interest and received by geophone 78 can likewise be determined. Gates 94 and 96 then can be conveniently set to open at this determined time after control 35 commands motor 36 to attain a given rate of revolution. This, then, permits the phase determination means and the amplitude ratio determination means to operate on essentially steady state signals.

It is preferred that the amplitude ratio and the phase relationship of the ground input steady state signal and the ground output steady state signal be averaged over a period of time to eliminate background noise. This length of average in time can be determined by one skilled in the art and is normally only a matter of seconds. Gates 114 and 118 can also be conveniently triggered by a signal from control 35 similarly as gates 94 and 96. However, gates 114 and 118 will be set for a longer period of time (perhaps 3 to 4 seconds longer or more) to permit averaging of the amplitude and phase relationships. Gate 120 can conveniently be set to open the same time as gates 114 and 118 although it is not essential.

Figure 3:
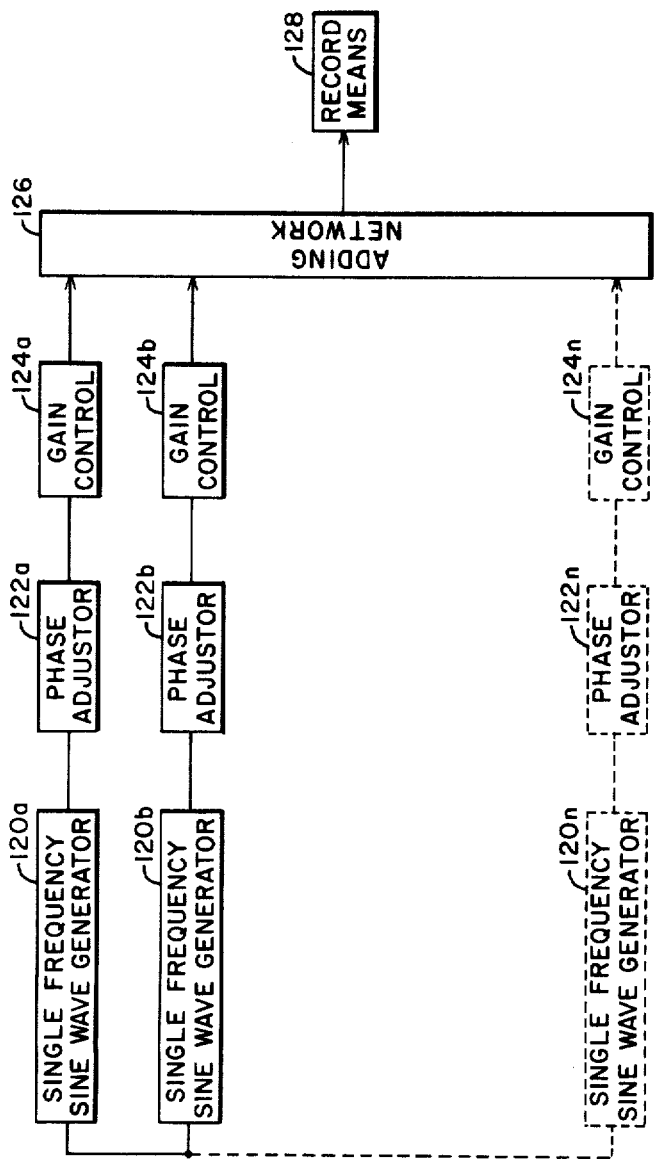
FIG. 3 illustrates one means for synthesizing a seismic signal from the information recorded in FIG. 2.

Referring now to FIG. 3 there is illustrated in block diagram form one means of synthesizing a composite seismic signal of the information recorded in the systems of FIG. 1 and FIG. 2. Illustrated in FIG. 3 are single frequency sine wave generators 120a to 120n. The number of frequency sine wave generators will be the number of single discrete frequencies generated by the vibrator and recorded on record 100 of FIG. 2, for example. Each of the sine wave generators 120a to 120n will generate a frequency corresponding to the recorded frequency. The outputs of the sine wave generators are connected to phase adjuster means 122a through 122n respectively. The phase adjusters may conveniently be adjustable delay circuits to impart the desired phase shifting in the generated sine waves. The phase adjusters 122a to 122n are electrically connected to gain controls 124a to 124n respectively. The gain controls are means of controlling the amplification of the sine wave signals received from the phase adjusters.

The output from each gain control 124a to 124n is passed to adding network 126. Adding network 126 then adds all the signals fed thereto together and its output then is a composite signal of its input signals. Stated differently, its output of adding network 126 may be considered to be a synthesized composite seismic signal. The output of adding network 126 is then recorded or displayed in any conventional manner by recording means 128.

It is thus believed clear that the apparatus shown in FIG. 3 can be used to synthesize a composite seismic signal from the information recorded in recording means 100 of FIG. 2. A sine wave is generated for, and having a frequency equal to, each frequency recorded. The generated sine wave then has its phase adjusted by phase adjuster 122a to 122n to agree with the recorded phase adjustment for each signal. The gain control then is adjusted to give the weight or value to each frequency in accordance with the amplitude ratio recorded. If desired, in synthesizing a composite seismic signal the gain control may be adjusted to weigh each frequency component in a manner that may be desired.

If it is desired to give the amplitude spectrum of the reflected composite seismic signal a desired or preselected shape, then in such cases only the recorded phase information from the various discrete frequencies is used. In such instances of exploration, it is only necessary to record the phase relationship. Then on synthesization of the signal, the amplification of each frequency component is assigned a value to make the spectrum rectangular or whatever shape is desired. In this procedure, then, a recording system is rather simple and will be cut in half as only data from the phase relationship of the earth input signal and the ground output signal are recorded.

Figure 4:
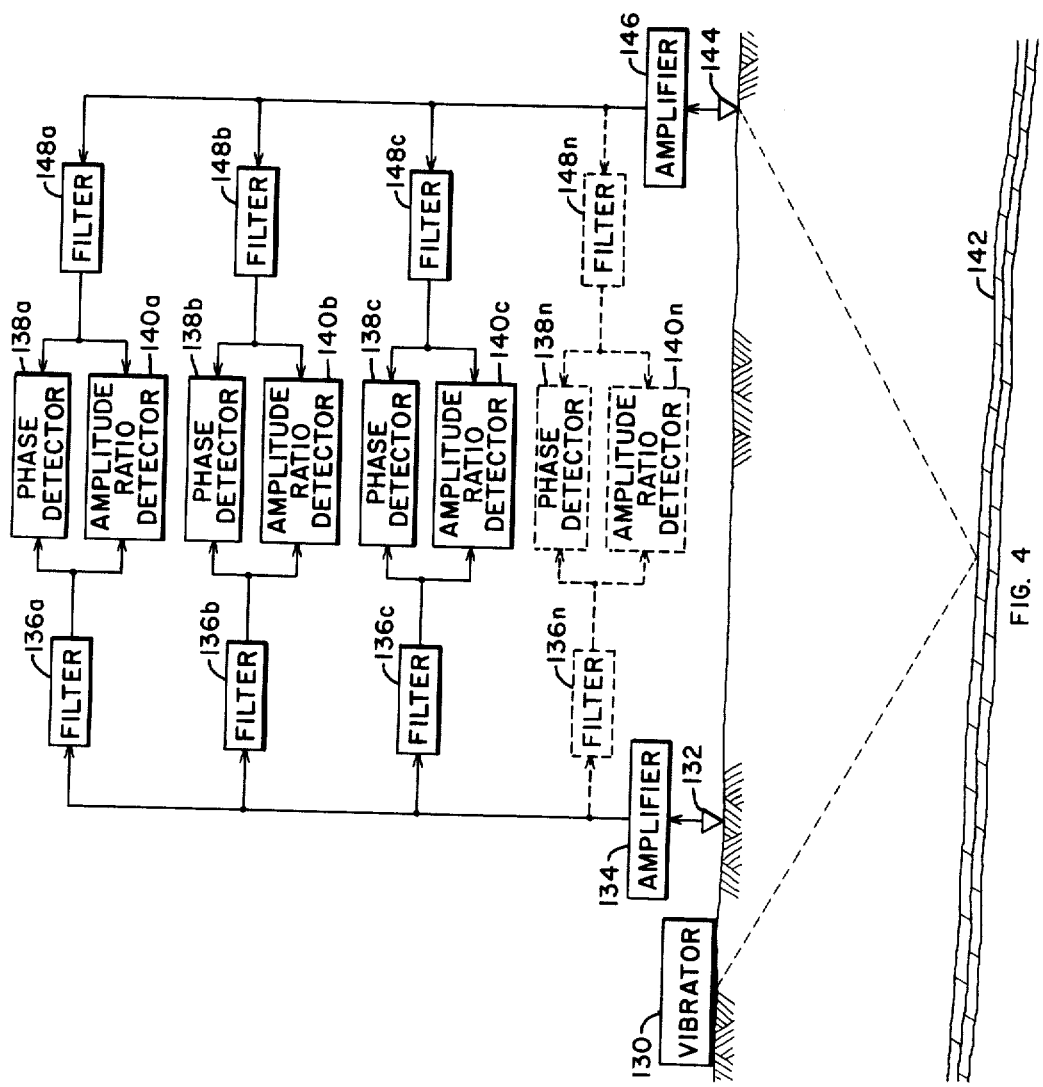
FIG. 4 represents an alternate embodiment of the invention.

Turning now to FIG. 4 there is illustrated another embodiment of this invention wherein discrete single frequencies are generated simultaneously and imparted into the earth simultaneously. The reflections are detected simultaneously and are broken down into discrete frequencies which are compared for phase and amplitude ratio with the corresponding discrete frequencies of the input signal. In FIG. 4, numeral 130 represents a vibrator capable of generating many discrete frequency components. A very suitable system for generating the discrete frequencies simultaneously is shown and described in copending patent application Ser. No. 855,322 filed in the name of Walter H. Glazier and assigned to a common assignee with the instant application. Of course, more than one vibrator can be used simultaneously if desired. Located adjacent vibrator 130 is geophone 132 connected to amplifier 134. The output of amplifier 134 then can be said to be the earth input signal. The earth input signal from amplifier 134 is fed to a series of narrow bandpass filters 136a to 136n. There is a narrow bandpass filter for each of the discrete frequency components generated by vibrator 130. For example, if there are 40 discrete frequencies one cycle apart generated, then there will be 40 filters having peaked filtering one cycle apart. The outputs from filters 136a to 136n are fed respectively to phase detectors 138a to 138n and to amplitude ratio detectors 140a to 140n respectively.

The downtraveling pulse from vibrator 130 is reflected by subsurface strata such as interface 142 and is reflected to the surface where it is detected by remotely located geophone 144. Geophone 144 may include a geophone station having several arrays of geophones arranged to emphasize the vertically traveling waves while de-emphasizing the horizontally traveling waves to improve reception of the desired components. The output of geophone 144 is fed to amplifier 146 for amplification. The output of amplifier 146 is fed through filters 148a to 148n. Filters 148a through 148n are identical to filters 136a to 136n respectively. The outputs of filters 148a to 148n are passed respectively to phase meters 138a to 138n and to amplitude ratio detectors 140a to 140n respectively.

The principle of operation of the apparatus in FIG. 4 is similar to that described above in regard to FIG. 1 and FIG. 2 except that the discrete frequencies are generated, transmitted, received and processed separately but simultaneously in time. It is first determined by known means the number and range of the frequency components desired to be in the downtraveling pulse. Vibrator 130 then is arranged to generate each of these frequencies simultaneously. The earth input is detected preferably by geophone 132 so that the coupling effect of vibrator 130 with the earth is not important to be known accurately. The signal detected by geophone 132 then contains all the discrete frequencies generated. These discrete frequencies are then separated by filters 136a through 136n.

The downtraveling pulse from generator 130 is reflected and detected at a remote location by geophone 144. This detected reflected signal also contains the discrete frequencies of the downtraveling pulse. The ground output signal from geophone 144 is amplified and separated into its discrete frequency components by filters 148a through 148n. The phase relation between each frequency component of the earth input signal and the ground output signal are detected by phase meters 138a through 138n. Likewise, the amplitude ratio between the two signals is detected by amplitude ratio detector 140a to 140n for each of the frequencies involved. It is desired that the phase detection and amplitude detection be determined after steady state conditions have been reached for the downtraveling pulse and for its reflection received at geophone 144. The phase and amplitude ratio then for each frequency can be recorded similarly as illustrated above in regard to the embodiment shown in FIG. 1 and FIG. 2. In FIG. 4 these values are all determined simultaneously; therefore, the operation of the device in FIG. 4 to generate and record a wide range of frequencies simultaneously takes less time than the devices shown in FIG. 1 or FIG. 2, for example.

While there are above disclosed but a limited number of embodiments of the system of the invention herein presented it is possible to produce still other embodiments without departing from the inventive concept herein disclosed. It is desired therefore that only such limitations be imposed on the appending claims as are stated therein.

What is claimed is:

1. A system of seismic prospecting wherein a first seismic transducer is near the seismic wave source and a second transducer is remote from the seismic wave source the combination which comprises: means to generate an essentially constant frequency seismic waveform capable of induction into the earth; a first time domain filter connected to the first transducer, said time domain filter of a character to emphasize a desired frequency and suppress other frequencies; a second time domain filter connected to the second seismic transducer and of a character to have a filter output emphasizing a desired frequency component and suppressing other frequencies; means to record the frequency of the transmitted signal and means to determine and record the ratio of amplitudes and the phase shift between the output of said first and said second time domain filters.

2. A system of seismic prospecting wherein a first seismic transducer is near the seismic wave source and a second transducer is remote from the seismic wave source the combination which comprises: a pair of rotatable eccentric weights having substantially parallel axis in a horizontal plane; means to counter rotate at essentially a selected steady state frequency the eccentric weights of said pair in substantially the same plane; a rigid base member from which the eccentric weights are supported; a first drum and a second drum rotatably mounted and supported from said base member, said drums being adapted to support a magnetic recording medium thereon; means to rotate said drums at a ratio of $n:1$ wherein $n$ is the number of rotations of the eccentric weights for each rotation of the drums; a first recording head mounted on and supported from said first drum and of a character to record a signal from the first transducer on the recording means of said first drum; a first reproducing head mounted about the periphery of said first drum from said recording head an angular distance of $360°/n$; a second recording head mounted on and supported from said second drum and of a character to record on the recording medium the signal from the second transducer; a second reproducing head mounted on and supported from said second drum and spaced from said second recording head an angular distance of $360°/n$; first adding means of a character to add the output from said first reproducing head to the output from the first seismic transducer; second adding means of a character to add the output from said second reproducing head to the output from the second transducer; means to record the frequency of the transmitted signal; and means to determine and record the phase shift and the ratio of amplitude between the output of said first adding and said second adding means.

3. A system as defined in claim 2 in which each drum has a plurality of reproducing heads spaced apart an angular distance of $360°/n$.

4. A method of obtaining a composite seismic signal having a selected frequency spectrum which comprises: generating successive discrete single frequencies of seismic waveforms at a point near the earth's surface, each of said waveforms having a different frequency within the selected spectrum, the frequencies generated being adequate in number and distribution to define the selected frequency spectrum; detecting the reflection of each transmitted single frequency seismic waveform and comparing it with the corresponding transmitted frequency seismic waveform; detecting and recording the amplitude ratio and phase relationship of the transmitted waveform and the detected reflected waveform for each frequency within the desired spectrum; and thereafter generating a sine wave for each frequency of the spectrum; adjusting the amplitude and phase of each sine wave in accordance with the recorded amplitude ratio and phase relationship; and adding the adjusted sine waves together thus synthesizing a composite seismic signal.

5. A system of seismic prospecting wherein a first seismic transducer is near the seismic wave source and a second seismic transducer is remote from the seismic wave source the combination which comprises: means to generate an essentially constant single frequency seismic waveform capable of induction into the earth; a first time domain filter connected to the first transducer, said time domain filter of a character to emphasize the desired frequency and suppress other frequencies; a second time domain filter connected to the second seismic transducer and of a character to have a filter output emphasizing a desired frequency and suppressing other frequencies; means to detect and to record the phase shift between the outputs of said first and said second time domain filters.

References Cited by the Examiner

UNITED STATES PATENTS

| | | | |
|---|---|---|---|
| 2,202,885 | 6/1940 | Zuschlag | 181—.53 |
| 2,675,086 | 4/1954 | Clewell | 181—.5 |
| 2,688,124 | 8/1954 | Doty et al | 340—15.5 |
| 2,826,750 | 3/1958 | Grannemann | 181—.5 |
| 2,894,245 | 7/1959 | Johnson | 181—.5 |
| 2,902,107 | 9/1959 | Erath et al | 181—.5 |
| 2,982,371 | 5/1961 | Woods et al | 340—15.5 X |
| 3,066,754 | 12/1962 | Johnson | 181—.53 |

FOREIGN PATENTS 573,546  4/1959  Canada.

OTHER REFERENCES

Somerville; "Harmonic Synthesizer for Demonstrating and Studying Complex Wave Forms", published in the Journal of Scientific Instruments, vol 21, October 1944.

BENJAMIN A. BORCHELT, *Primary Examiner.*

SAMUEL FEINBERG, CHESTER L. JUSTUS, CARL W. ROBINSON, *Examiners.*